US010313386B1

(12) United States Patent
Roturier et al.

(10) Patent No.: US 10,313,386 B1
(45) Date of Patent: Jun. 4, 2019

(54) SYSTEMS AND METHODS FOR ASSESSING SECURITY RISKS OF USERS OF COMPUTER NETWORKS OF ORGANIZATIONS

(71) Applicant: Symantec Corporation, Mountain View, CA (US)

(72) Inventors: Johann Roturier, County Kildare (IE); Yun Shen, Post-B (GB); David Silva, Dublin (IE)

(73) Assignee: Symantec Corporation, Mountain View, CA (US)

( * ) Notice: Subject to any disclaimer, the term of this patent is extended or adjusted under 35 U.S.C. 154(b) by 161 days.

(21) Appl. No.: 15/471,268

(22) Filed: Mar. 28, 2017

(51) Int. Cl.
  *G06F 12/16* (2006.01)
  *H04L 29/06* (2006.01)
  *H04L 29/08* (2006.01)

(52) U.S. Cl.
  CPC ...... *H04L 63/1433* (2013.01); *H04L 63/0428* (2013.01); *H04L 67/02* (2013.01); *H04L 67/42* (2013.01)

(58) Field of Classification Search
  None
  See application file for complete search history.

(56) References Cited

U.S. PATENT DOCUMENTS

| 9,294,498 B1* | 3/2016 | Yampolskiy | H04L 63/1433 |
| 9,537,880 B1* | 1/2017 | Jones | H04L 63/1425 |
| 2014/0282977 A1* | 9/2014 | Madhu | G06Q 50/265 726/7 |
| 2015/0264084 A1* | 9/2015 | Kashyap | H04L 63/1483 726/22 |

OTHER PUBLICATIONS

Thonnard et al., Are You at Risk? Profiling Organizations and Individuals Subject to Targeted Attacks, Financial Cryptography and Data Security, FC 2015, Lecture Notes in Computer Science, vol. 8975. Springer, Berlin, Heidelberg; https://link.springer.com/chapter/10.1007/978-3-662-47854-7_2, 2015.

(Continued)

*Primary Examiner* — Brandon S Hoffman
(74) *Attorney, Agent, or Firm* — FisherBroyles, LLP

(57) ABSTRACT

The disclosed computer-implemented method for assessing security risks of users of computer networks of organizations may include (i) detecting, at a risk computing device, a location of a host electronically accessed by a user computing device, the host location having an electronic address outside of a computer network of an organization, (ii) identifying, at the risk computing device, a host user credential sent to the host location from the user computing device, (iii) determining, at the risk computing device, that the host user credential matches an organization user credential associated with the organization's computer network, and (iv) calculating, at the risk computing device, a risk score for a user of the user computing device based on the determination that the host user credential matches the organization user credential. Various other methods, systems, and computer-readable media are also disclosed.

18 Claims, 6 Drawing Sheets

(56) References Cited

OTHER PUBLICATIONS

Canali et al., On the effectiveness of risk prediction based on users browsing behavior, Proceedings of the 9th ACM symposium on Information, computer and communications security (ASIA CCS '14), ACM, New York, NY, USA, 171-182; http://dl.acm.org/citation.cfm?id=2590347.
Peterson et al., Architectural Risk Analysis; https://www.us-cert.gov/bsi/articles/best-practices/architectural-risk-analysis/architectural-risk-analysis, as accessed Mar. 9, 2017 (Oct. 3, 2005).
Theoharidou et al., A Risk Assessment Method for Smartphones, Information Security and Privacy Research, SEC 2012, IFIP Advances in Information and Communication Technology, vol. 376; https://link.springer.com/chapter/10.1007/978-3-642-30436-1_36, 2012.
Lecture #4: HITS Algorithm—Hubs and Authorities on the Internet; http://www.math.cornell.edu/~mec/Winter2009/RalucaRemus/Lecture4/lecture4.html; as accessed Mar. 9, 2017 (Mar. 23, 2009); Cornell University.

\* cited by examiner

SYSTEMS AND METHODS FOR ASSESSING SECURITY RISKS OF USERS OF COMPUTER NETWORKS OF ORGANIZATIONS

BACKGROUND

Individuals and organizations increasingly utilize software and services that are accessed over a network. Often, users reuse credentials, such as usernames and passwords, or the credentials of other users to register with multiple online domains. Such reuse of credentials can put users and organizations at risk. For example, user credentials used at one domain may be discovered by a malicious party that uses the credentials to access other domains, including domains containing private information and accounts for the users.

Frequently, users within an organization reuse their organization credentials to log into web domains that are not associated with the organization, putting organization accounts at increased risk of access by unauthorized parties. Such unauthorized access to organization accounts may be costly and time-consuming to address. Additionally, sensitive information from within organizations may be obtained and utilized by malicious parties, resulting in unrecoverable losses to the organizations. The instant disclosure, therefore, identifies and addresses a need for systems and methods for assessing security risks of users of computer networks of organizations.

SUMMARY

As will be described in greater detail below, the instant disclosure describes various systems and methods for assessing security risks of users of computer networks of organizations.

In one example, a computer-implemented method for assessing security risks of users of computer networks of organizations may include (i) detecting, at a risk computing device, a location of a host electronically accessed by a user computing device, the host location having an electronic address outside of a computer network of an organization, (ii) identifying, at the risk computing device, a host user credential sent to the host location from the user computing device, (iii) determining, at the risk computing device, that the host user credential matches an organization user credential associated with the organization's computer network, and (iv) calculating, at the risk computing device, a risk score for a user of the user computing device based on the determination that the host user credential matches the organization user credential.

In at least one embodiment, the organization user credential may include at least one of an email address, a password, a user identifier, an organization identifier; a public key infrastructure certificate; a token; and a personal identification number. Detecting the location of the host may further include detecting, at the risk computing device, a uniform resource locator (URL) for the host location. Detecting the location of the host may further include detecting, at the risk computing device, a hostname for the URL. The computer-implemented method may additionally include determining, at the risk computing device, that the user was logged onto the user computing device when the host location was electronically accessed by the user computing device. The computer-implemented method may further include determining, at the risk computing device, that the user was logged into a web gateway of the organization's computer network when the host location was electronically accessed by the user computing device.

In some embodiments, the computer-implemented method may also include determining, at the risk computing device, that the organization user credential is associated with the user. The computer-implemented method may further include determining, at the risk computing device, that the organization user credential is associated with an additional user. The computer-implemented method may additionally include (i) detecting, at the risk computing device, a location of an additional host electronically accessed by the user computing device, the additional host location having an electronic address outside of the organization's computer network, and (ii) determining, at the risk computing device, that the host user credential was sent to the additional host location from the user computing device.

In one embodiment, the computer-implemented method may additionally include (i) determining, at the risk computing device, that the host location was electronically accessed by an additional user computing device, (ii) identifying, at the risk computing device, an additional host user credential sent to the host location from the additional user computing device, and (iii) determining, at the risk computing device, that the additional host user credential matches an additional organization user credential associated with the organization's computer network. The computer-implemented method may further include calculating, at the risk computing device, a risk score for the host location. The computer-implemented method may also include determining, at the risk computing device, a type of credential corresponding to the organization user credential, wherein calculating the risk score for the user further includes utilizing a weight corresponding the type of credential.

In at least one embodiment, calculating the risk score for the user may further include utilizing a weight that is based on a determination of a number of host user credentials sent to the host location from the user computing device, each of the determined number of host user credentials corresponding to a separate organization user credential. Identifying the host user credential sent to the host location may also include identifying the host user credential in a query parameter at a URL for the host location. Identifying the host user credential sent to the host location may additionally include identifying the host user credential in a hypertext transfer protocol (HTTP) request header. Identifying the host user credential sent to the host location may also include decrypting information sent from the user computing device to the host location. In at least one embodiment, the computer-implemented method may include determining, at the risk computing device, that the user presents a security risk to the organization's computer network based on the risk score. Additionally, the computer-implemented method may include performing, at the risk computing device, a security action to protect the organization's computer network based on the determination that the user presents a security risk to the organization's computer network.

In one embodiment, a system for assessing security risks of users of computer networks of organizations may include several modules stored in memory, including (i) a detection module, stored in memory, that detects, at a risk computing device, a location of a host electronically accessed by a user computing device, the host location having an electronic address outside of a computer network of an organization, (ii) an identification module, stored in memory, that identifies, at the risk computing device, a host user credential sent to the host location from the user computing device, (iii) a determination module, stored in memory, that determines, at the risk computing device, that the host user credential matches an organization user credential associated with the organization's computer network, (iv) a calculation module, stored in memory, that calculates, at the risk computing device, a risk score for a user of the user computing device based on the determination that the host user credential matches the organization user credential, and (v) at least one physical processor that executes the detection module, the identification module, the determination module, and the calculation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect, at a risk computing device, a location of a host electronically accessed by a user computing device, the host location having an electronic address outside of a computer network of an organization, (ii) identify, at the risk computing device, a host user credential sent to the host location from the user computing device, (iii) determine, at the risk computing device, that the host user credential matches an organization user credential associated with the organization's computer network, and (iv) calculate, at the risk computing device, a risk score for a user of the user computing device based on the determination that the host user credential matches the organization user credential.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
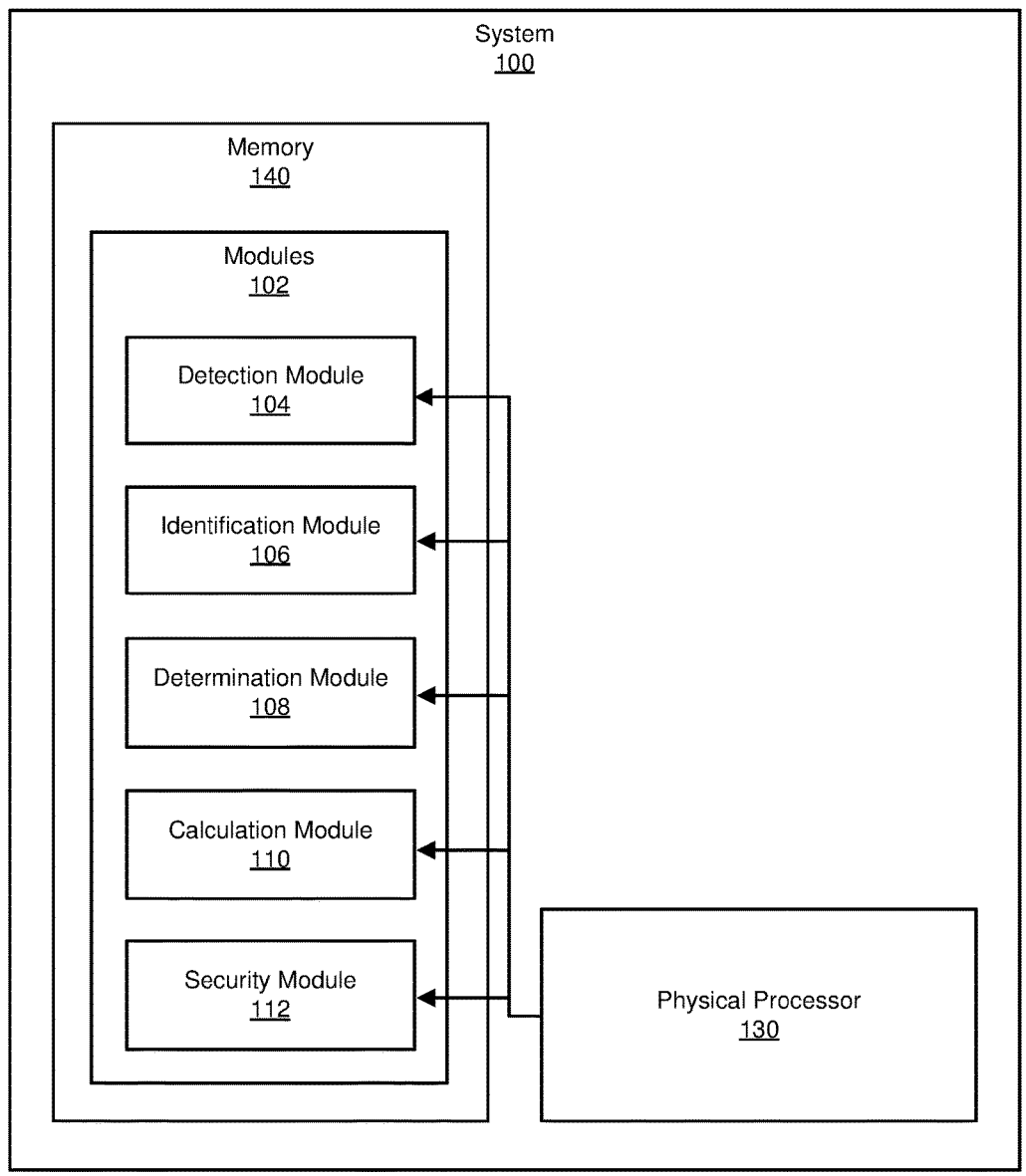
FIG. 1 is a block diagram of an example system for assessing security risks of users of computer networks of organizations.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for assessing security risks of users of computer networks of organizations. As will be explained in greater detail below, the systems and methods described herein may analyze interactions by organization users with host locations, such as domains, outside of the organization. The interactions may be analyzed to identify intra-party and inter-party reuse of organization credentials by the organization users and to generate risk scores for the organization users and/or for the organization. The risk scores may be used to determine users in the organization that present an increased risk to the organization. Policy-based corrective security measures may be taken to address higher-risk users in the organization, thereby preventing loss of sensitive data and increasing the security of the organization as a whole while directing resources to the users that present greatest risk.

Figure 2:
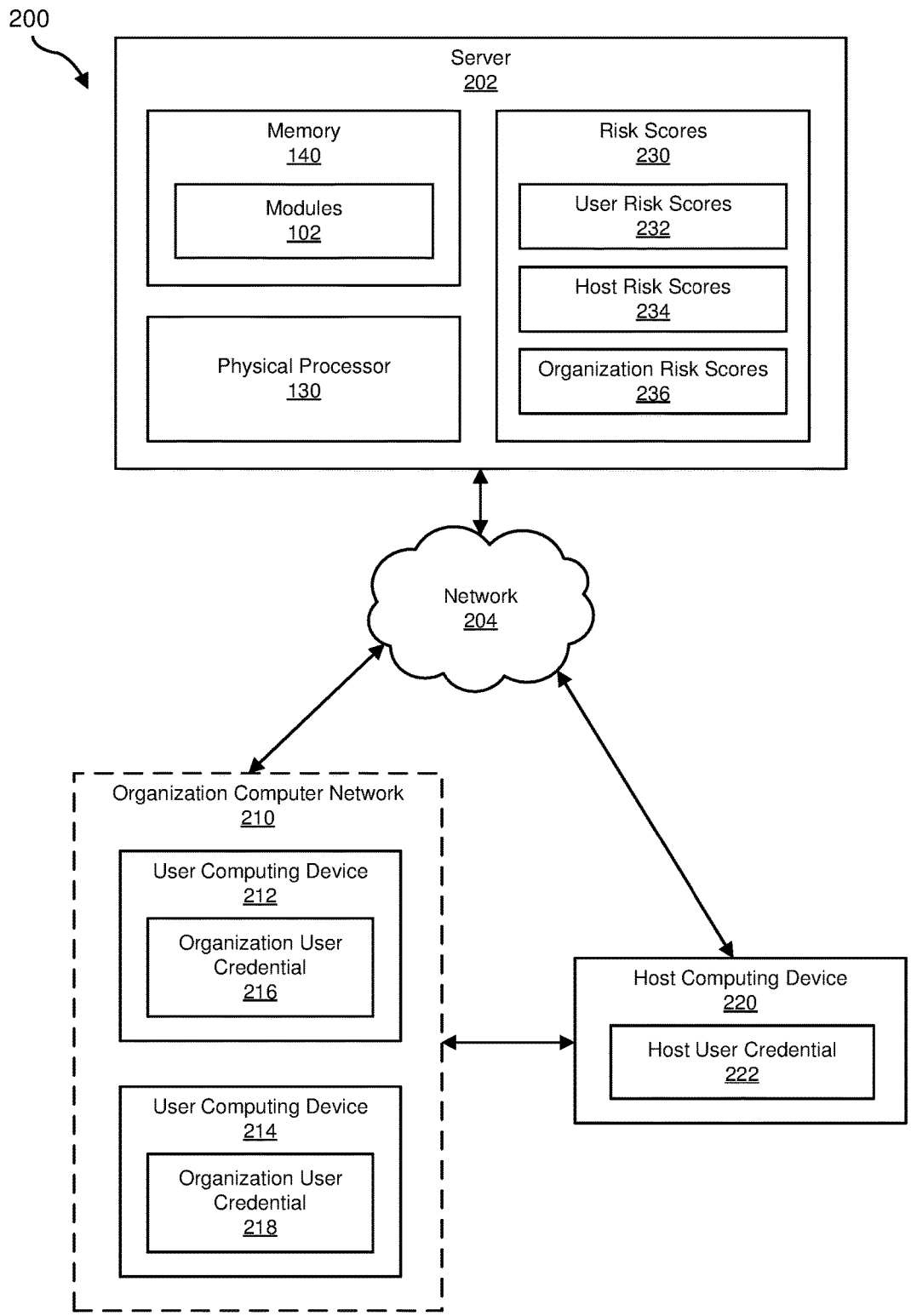
FIG. 2 is a block diagram of an additional example system for assessing security risks of users of computer networks of organizations.

The following will provide, with reference to FIGS. 1-2, detailed descriptions of example systems for assessing security risks of users of computer networks of organizations. Detailed descriptions of corresponding computer-implemented methods will also be provided in connection with FIG. 3. Detailed descriptions of example risk analysis data that is used for assessing security risks of users of computer networks of organizations will be provided in connection with FIG. 4. In addition, detailed descriptions of an example computing system and network architecture capable of implementing one or more of the embodiments described herein will be provided in connection with FIGS. 5 and 6, respectively.

FIG. 1 is a block diagram of an example system 100 for assessing security risks of users of computer networks of organizations. As illustrated in this figure, example system 100 may include one or more modules 102 for performing one or more tasks. For example, and as will be explained in greater detail below, example system 100 may include a detection module 104 that detects a location of a host electronically accessed by a user computing device, the host location having an electronic address outside of a computer network of an organization. Example system 100 may also include an identification module 106 that identifies a host user credential sent to the host location from the user computing device. Example system 100 may additionally include a determination module 108 that determines that the host user credential matches an organization user credential associated with the organization's computer network. Example system 100 may also include a calculation module 110 that calculates a risk score for a user of the user computing device based on the determination that the host user credential matches the organization user credential. Additionally, example system 100 may also include a security module 112 that performs a security action to protect the organization's computer network based on a determination that the user presents a security risk to the organization's computer network. Although illustrated as separate elements, one or more of modules 102 in FIG. 1 may represent portions of a single module or application.

The term "security action," as used herein, generally refers to one or more actions the systems described herein may take after determining that a user and/or a location, such as a URL and/or domain, presents a security risk to the organization's computer network. For example, security actions may include, without limitation, preventing a user from accessing the organization's computer network for at least a specified period of time, warning the user and/or an administrator about the increased security risk presented by the user's activities, increasing monitoring of user activities, limiting and/or blocking the user's access to locations, such as URLs and/or domains external to the organization's computer network, changing one or more organization user credentials for the user, and/or increasing a risk score and/or profile for an organization associated with the organization's computer network. In addition, the systems described herein may perform a security action on locations external to the organization's computer network. For example, the systems described herein may blacklist URLs and/or domains, such as URLs and/or domains having a risk score exceeding a predetermined threshold.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., server 202, user computing device 212, and/or user computing device 214). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate assessing security risks of users of computer networks of organizations. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a server 202 in communication with user computing device 212 and user computing device 214 of organization computer network 210 via a network 204. In at least one example, server 202 may also be in communication with host computing device 220 via network 204. Server 202 may include risk scores 230, including user risk scores 232, host risk scores 234, and/or organization risk scores 236 that are calculated and used in identifying and assessing security risks of user, host locations (e.g., URL and/or domain hosts), and/or organizations. User computing device 212 may include at least one organization user credential associated with a user of user computing device 212, such as organization user credential 216. Additionally, user computing device 214 may include at least one organization user credential associated with a user of user computing device 214, such as organization user credential 218.

In one example, all or a portion of the functionality of modules 102 may be performed by server 202, user computing device 212, user computing device 214, and/or any other suitable computing system. As will be described in greater detail below, one or more of modules 102 from FIG. 1 may, when executed by at least one processor of server 202, user computing device 212, and/or user computing device 214, enable server 202, user computing device 212, and/or user computing device 214 to identify and assess user security risk for an organization. For example, and as will be described in greater detail below, one or more of modules 102 may cause server 202, user computing device 212, and/or user computing device 214 to (i) detect a location of a host electronically accessed by a user computing device, the host location having an electronic address outside of a computer network of an organization, (ii) identify a host user credential sent to the host location from the user computing device, (iii) determine that the host user credential matches an organization user credential associated with the organization's computer network, and (iv) calculate a risk score for a user of the user computing device based on the determination that the host user credential matches the organization user credential.

Server 202 generally represents any type or form of computing device that is capable of identifying and analyzing interactions between computing devices within and/or associated with an organization's computer network and locations external to the organization's computer network and assessing security risks of users of the computing devices. Examples of server 202 include, without limitation, security servers, application servers, web servers, storage servers, and/or database servers configured to run certain software applications and/or provide various security, web, storage, and/or database services. Although illustrated as a single entity in FIG. 2, server 202 may include and/or represent a plurality of servers that work and/or operate in conjunction with one another.

User computing device 212 and user computing device 214 each generally represents any type or form of computing device capable of reading computer-executable instructions. User computing device 212 and user computing device 214 may each be user computing devices that are utilized by employees of an organization, that are part of organization computer network 210, and/or that are otherwise associated with and/or connected to organization computer network 210. Examples of user computing device 212 and user computing device 214 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Network 204 generally represents any medium or architecture capable of facilitating communication or data transfer. In one example, network 204 may facilitate communication between user computing device 212, user computing device 214, host computing device 220, and server 202. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Organization computer network 210 generally represents any medium or architecture capable of facilitating communication or data transfer between computing devices that are part of an organization and/or that are associated with an organization (e.g., computing devices that provide at least one service that is utilized by organization computer network 210). Organization computer network 210 may be controlled by and/or associated with any suitable type of organization, without limitation, including a government, business, company, club, institution, society, association, political, and/or any other organized group of individuals and/or computing systems organized for any purpose, without limitation. Organization computer network 210 may comprise a network that links computing systems particular to and/or related to the organization. In one example, organization computer network 210 may facilitate communication between user computing device 212, user computing device 214, and/or any other computing device, such as a user computing device, administrator device, server, database and/or any other suitable device, belonging to and/or associated with an organization. In this example, organization computer network 210 may facilitate communication or data transfer using wireless and/or wired connections. Examples of organization computer network 210 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Host computing device 220 generally represents any type or form of computing device capable of reading computer-executable instructions. Host computing device 220 may be a computing device, server, database, and/or any other device and/or partitioned portion of a device that is not associated with organization computer network 210. For example, host computing device 220 may be a server that hosts a web domain that is not associated with organization computer network 210. Examples of host computing device 220 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device and/or cloud-based system.

Figure 3:
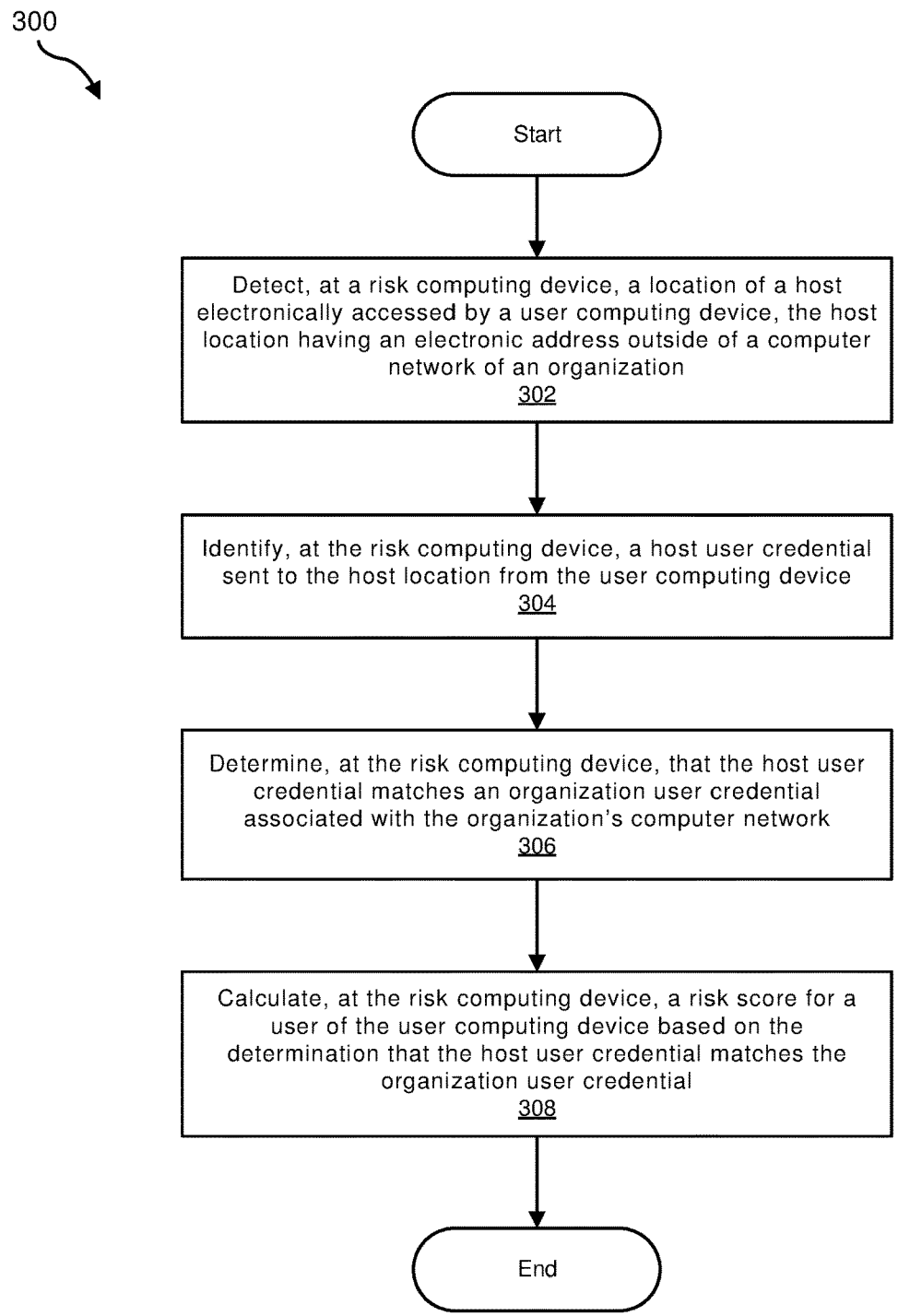
FIG. 3 is a flow diagram of an example method for assessing security risks of users of computer networks of organizations.

FIG. 3 is a flow diagram of an example computer-implemented method 300 for assessing security risks of users of computer networks of organizations. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may detect, at a risk computing device, a location of a host electronically accessed by a user computing device, the host location having an electronic address outside of a computer network of an organization. For example, detection module 104 may, as part of server 202 in FIG. 2, detect a location of host computing device 220 electronically accessed by user computing device 212, the host computing device 220 location having an electronic address outside of organization computer network 210.

Detection module 104 may detect a location of host computing device 220 in a variety of ways. In some embodiments, detection module 104 may detect a location of host computing device 220, which was electronically accessed by user computing device 212, by monitoring traffic between computing devices that are part of organization computer network 210 and/or that are otherwise associated organization computer network 210 and locations, such as web locations, that are external to organization computer network 210. In some embodiments, URLs, such as HTTP-based URLs, that are electronically accessed by user computing devices of organization computer network 210 may be monitored and user access events may be logged. Information associated with the access events may also be obtained in conjunction with the monitoring. For example, URL artefact that include credentials and/or indicators of credentials submitted by user computing device 212 to external host locations, such as a location of host computing device 220, may be obtained, as will be described in greater detail below. In some examples, computing devices that are not part of organization computer network 210, but that are used by users associated with organization computer network 210, may be monitored to detect locations electronically accessed by the computing devices, including locations within organization computer network 210 and locations external to organization computer network 210. For example, a user on a device that is not part of organization computer network 210 may log into organization computer network 210 through a portal, such as a corporate gateway, and may access locations within organization computer network 210 and external to organization computer network 210.

Any suitable monitoring system may be utilized to monitor traffic between devices that are part of organization computer network 210 and devices that are external to organization computer network 210. In at least one embodiment, monitoring may be conducted using a gateway, such as, for example, a secure corporate gateway service (e.g., BLUECOAT On-Premise Secure Web Gateway) and/or an endpoint browser. Such a gateway service may authenticate users and/or user computing devices using a secure login. Additionally, the gateway service may track web traffic between user computing devices and locations that are within organization computer network 210 and external to organization computer network 210. The gateway service may keep a log of locations, such as URLs and/or domain names, visited by user computing devices.

At step 304 in FIG. 3, one or more of the systems described herein may identify, at the risk computing device, a host user credential sent to the host location from the user computing device. For example, identification module 106 may, as part of server 202 in FIG. 2, identify a host user credential 222 sent to the host computing device 220 location from user computing device 212.

The terms "credential" and "user credential" as used herein generally refer to a unique object, such as a text object (e.g., alphanumeric string) and/or other data object (e.g., bit data), that may be used for purposes of verification, identification, and/or authorization. Examples of credentials include, without limitation, user names, emails addresses, user identifiers, organization identifiers, passwords, and/or other identifying and/or unique credentials, such as public key infrastructure certificates, tokens, personal identification numbers (PIN), and/or biometric identifiers. In some embodiments, credentials may be associated with a user, a user computing device, and/or a network (e.g., an organization's computer network).

Identification module 106 may identify host user credential 222 in a variety of ways. In some embodiments, identification module 106 may identify at least one host user credential 222, such as a name, a password, and/or any other identifying user and/or organizational credential, that is sent to the host computing device 220 location from user computing device 212. For example, a monitoring service, such as a web gateway, may log data that includes text entries of user names, emails addresses, user identifiers, organization identifiers, passwords, and/or other credentials (e.g., PKI certificates, tokens, PIN numbers, etc.) that are input from user computing device 212 into one or more fields of a webpage presented by host computing device 220. In some embodiments, the at least one host user credential 222 may be obtained from information generated and/or stored, at least temporarily, by host computing device 220. For example, a URL corresponding to a location hosted by host computing device 220 may receive cleartext entries from user computing device 212. These entries may be stored, at least temporarily, in a URL, such as a throw-away URL and/or an ignored HTTP-based URL. In at least one embodiment, at least one host user credential 222 may be obtained by extracting query parameters from a URL.

In one embodiment, a log of locations that are electronically accessed by user computing device 212, along with corresponding data associated with the user access, may be compiled and stored, and the locations may each be analyzed to determine what, if any, user credentials are contained in information associated with the locations. For example, a corporate gateway may log all URLs, including query parameters, throw-away URLs, and/or ignored HTTP-based URLs, electronically accessed by user computing device 212 within a specified time frame and may store data (e.g., URL artefacts) generated in association with each of the URLs. In some embodiments, identification module 106 may analyze a list of URLs electronically accessed by user computing device 212, such as a list of HTTP-based URLs, and identify URLs where user credentials, such as user names, passwords, and/or other identifying user and/or organizational credentials have been sent from user computing device 212 to host locations external to organization computer network 210. For example, identification module 106 may identify query parameters that have been sent from user computing device 212 to locations external to organization computer network 210 in cleartext to identify user credentials sent to the locations. In at least one embodiment, identification module 106 may analyze stored HTTP request headers that include HTTP basic authentication information to identify user credentials sent to locations external to organization computer network 210. Identification module 106 may extract any user and/or organization credentials from the data, such as query parameters and/or header data, associated with the locations.

In at least one embodiment, the systems and methods described herein may detect, at the risk computing device, a hostname for the URL. Detection module 104 may, for example, extract a hostname, such as a domain name, for each location, such as each URL, contained in a log of locations external to organization computer network 210 that are electronically accessed by user computing device 212. For example, detection module 104 may determine that multiple logged URLs are each associated with a common hostname, such as a hostname corresponding to host computing device 220. Identification module 106 may then identify user credentials transmitted by user computing device 212 to each distinct hostname.

In some embodiments, identifying the host user credential sent to the host location may further include decrypting information sent from the user computing device to the host location. For example, identification module 106 may decrypt, as part of server 202, information sent from user computing device 212 to the host computing device 220 location. In at least one embodiment, information sent from user computing device 212 may be sent to an HTTPS-based URL hosted by host computing device 220 such that the information is encrypted at host computing device 220 and/or prior to being sent to the host computing device 220 location. In certain embodiments, user computing device 212 may use a proxy service to access a URL hosted by host computing device 220. The data sent to the host computing device 220 location may be encrypted by the proxy service. Identification module 106 may decrypt data that has been encrypted using any suitable technique, without limitation. For example, a gateway service monitoring traffic to and from user computing device 212 may obtain a cipher that is transmitted from user computing device 212 to the host computing device 220 location, or that is transmitted from the host computing device 220 location to user computing device 212, and identification module 106 may utilize the cipher to decrypt data sent between user computing device 212 and the host computing device 220 location. A host user credential 222 sent from user computing device 212 to the host computing device 220 location may then be identified from the decrypted data.

At step 306 in FIG. 3, one or more of the systems described herein may determine, at the risk computing device, that the host user credential matches an organization user credential associated with the organization's computer network. For example, determination module 108 may, as part of server 202 in FIG. 2, determine that host user credential 222 matches an organization user credential (e.g., organization user credential 216 and/or organization user credential 218) associated with organization computer network 210.

Determination module 108 may determine that host user credential 222 matches an organization user credential in variety of ways. In one embodiment, determination module 108 may compare host user credential 222 with one or more user credentials associated organization computer network 210. For example, determination module 108 may determine whether host user credential 222, or at least a portion of host user credential 222, matches an organization user credential 216 for a user of user computing device 212. A determination that host user credential 222 matches a user credential associated with organization computer network 210, such as organization user credential 216, may demonstrate that a user of user computing device 212 reused organization user credential 216 on a URL hosted by host computing device 220. For example, the user of user computing device 212 may have reused organization user credential 216 to set up a user account with the URL and/or to receive notifications (e.g., email updates and/or notifications) from the URL.

In some embodiments, determination module 108 may determine that more than one organization user credential was supplied by user computing device 212 and/or a user of user computing device 212 to a location, such as a location of host computing device 220, external to organization computer network 210. For example, identification module 106 may identify multiple host user credentials sent by user computing device 212 to a location of host computing device 220. Determination module 108 may then determine that each of the host user credentials match a different organization user credential associated with user computing device 212 and/or a user of user computing device 212. For example, identification module 106 may extract a first host user credential from a URL hosted by host computing device 220 and determination module 108 may determine that the first host user credential corresponds to an organization email address of a user associated with organization computer network 210, such as a user of user computing device 212. Identification module 106 may also extract a second host user credential from the URL hosted by host computing device 220 and determination module 108 may determine that the second host user credential corresponds to a password (e.g., a password used to login to the email account or other organization account or portal) for the user of user computing device 212.

In some embodiments, determination module 108 may also compare host user credential 222 with organization user credentials for one or more other users. For example, determination module 108 may determine whether a user associated with organization computer network 210 electronically accessed the host computing device 220 location using at least one user credential belonging to a user, other than a user of user computing device 212, associated with organization computer network 210. Determination module 108 may, for example, determine that host user credential 222 matches organization user credential 218, which is associated with a user of user computing device 214. A determination that host user credential 222 matches organization user credential 218 may demonstrate inter-user password reuse of another user's password by a user of user computing device 212 on a URL hosted by host computing device 220. For example, the user of user computing device 212 may have reused organization user credential 218 for another user associated with organization computer network 210 to set up a user account with the URL and/or to receive notifications (e.g., email updates and/or notifications) from the URL.

In some embodiments, one or more of the systems described herein may determine that a user was logged onto the user computing device when the host location was electronically accessed by the user computing device. For example, determination module 108 may determine, as part of server 202 in FIG. 2, that a user of user computing device 212 was logged onto user computing device 212 when a URL hosted by host computing device 220 was electronically accessed by user computing device 212. In at least one embodiment, one or more of the systems described herein may determine that the user was logged into a web gateway for the organization when the host location was electronically accessed by the user computing device. For example, determination module 108 may determine, as part of server 202, that a user of user computing device 212 was logged into a corporate gateway for organization computer network 210 when a URL hosted by host computing device 220 was electronically accessed by user computing device 212. As described in greater detail above, a corporate gateway may be utilized to monitor and log locations electronically accessed by user computing device 212 and to identify that host user credential 222 was sent to the host computing device 220 location by user computing device 212.

In at least one embodiment, one or more of the systems described herein may identify, at the risk computing device, an additional host location electronically accessed by the user computing device, the additional host location having an electronic address outside of the organization network. For example, identification module 106 may identify, as part of server 202 in FIG. 2, an additional host location, such as a URL in addition a URL hosted by host computing device 220, that was electronically accessed by user computing device 212, the additional host location having an electronic address outside of organization computer network 210. One or more of the systems described herein may then determine that the host user credential sent to the host computing device 220 location was also sent to the additional host location from user computing device 212. For example, determination module 108 may determine, as part of server 202, that host user credential 222, which was sent by user computing device 212 to the host computing device 220 location, was also sent to the additional host location from user computing device 212. Such a determination may demonstrate that a user of user computing device 212 has reused an organization user credential, such as organization user credential 216, at multiple locations, such as URLs and/or domains, that are external to organization computer network 210.

In some embodiments, one or more of the systems described herein may determine, at the risk computing device, that the host location was electronically accessed by an additional user computing device. For example, determination module 108 may determine, as part of server 202 in FIG. 2, that a URL hosted by host computing device 220 was electronically accessed by another user computing device, such as user computing device 214, in addition to having been electronically accessed by user computing device 212. Additionally, one or more of the systems described herein may identify an additional host user credential sent to the host location from the additional user computing device. For example, identification module 106 may identify, as part of server 202, another host user credential, such as a host user credential that is distinct from host user credential 222 sent by user computing device 212 to the host computing device 220 location, that is sent from user computing device 214. One or more of the systems described herein may then determine that the additional host user credential matches an additional organization user credential associated with the organization's computer network. For example, determination module 108 may determine, as part of server 202, that the additional host user credential matches an additional user credential, such as organization user credential 218, which is associated with organization computer network 210. Such a determination may demonstrate that multiple users associated with organization computer network 210 have reused organization user credentials at locations external to organization network, and further, that the multiple users have reused the organization user credentials at a common external location (e.g., a URL hosted by host computing device 220).

At step 308 in FIG. 3, one or more of the systems described herein may calculate, at the risk computing device, a risk score for a user of the user computing device based on the determination that the host user credential matches the organization user credential. For example, calculation module 110 may, as part of server 202 in FIG. 2, calculate a risk score for a user of user computing device 212 based on the determination that host user credential 222 matches organization user credential 216.

Calculation module 110 may calculate the risk score in variety of ways. In one embodiment, a risk score for a user may represent a level of risk that the user presents to an organization that manages and/or is otherwise associated with organization computer network 210. Risk scores of various users in an organization may be determined based, at least in part, on reuse of user credentials, such as organization user credentials, at locations, such as web-based locations, that are external to organization computer network 210. For example, user risk scores 232 stored on server 202 may include risk scores for some or all organization members (e.g., employees) associated with organization computer network 210 and/or one or more computing devices in organization computer network 210. In some embodiments, user risk scores corresponding to various users in the organization may be compared with each other and/or ranked. Users with a high risk score, either relative to other users in the organization and/or relative to a broader sample of users, including users outside the organization, may be identified as high-risk users in regards to relative security risk the users present to the organization and/or entities (e.g., clients, service providers, etc.) interfacing with the organization. Alternatively, users with a low risk score may be identified as low-risk users In some embodiments, user risk scores for users associated with organization computer network 210 may be used to calculate an organization risk score for the organization. An organization risk score may, for example, be stored in organization risk scores 236 on server 202. The organization risk score may represent a level of security risk for the organization that is based, at least in part, on the security practices of its users. For example, if a significant number and/or proportion of users associated with organization computer network 210 have relatively high risk scores, organization computer network 210 may have an organization risk score that is higher relative to other organizations. In certain embodiments, risk scores for various locations, such as URLs and/or domains, that are external to organization computer network 210 may be determined and stored, for example, in host risk scores 234 on server 202. Host locations, such as the host computing device 220 location, having a relatively high host risk score may represent host locations at which users associated with organization computer network 210 frequently reuse organization user credentials and/or host locations that have received organization user credentials from multiple users associated with organization computer network 210 and/or from users associated with additional organization networks.

In at least one example, one or more of the systems described herein may determine, at the risk computing device, a type of credential corresponding to the organization user credential, and calculating the risk score for the user may further include utilizing a weight corresponding to the type of credential. For example, determination module 108 may, as part of server 202 in FIG. 2, determine a type of credential corresponding to organization user credential 216, and calculation module 110 may, as part of server 202, calculate the risk score for the user by utilizing a weight corresponding to the determined type of credential.

Determination module 108 may determine the type of credential and calculation module 110 may calculate the risk score in variety of ways. Any suitable calculation function may be utilized to by calculation module 110 to calculate risk scores for users. In one embodiment, a node/edge weighted hyperlink-induced topic search (HITS) algorithm may be used to calculate user risk scores and/or host risk scores, with weights being applied to each node of the algorithm based on various factors. In at least one embodiment, different types of user credentials may be assigned different weights for purposes of calculating risk scores, such as user risk scores, organization risk scores, and/or host risk scores. For example, a first type of user credential, such as a user name or email address, may have a lower weight than a second type of user credential, such as a password.

In various embodiments, calculating a risk score for a user may include utilizing a weight that is based on a determination of a number of host user credentials sent to the host location from the user computing device, each of the determined number of host user credentials corresponding to a separate organization user credential. For example, different weights may be assigned based on a number of user credentials sent by a user from a user computing device, such as user computing device 212, to an external location, such as a location of host computing device 220. In one embodiment, a lower weight may be assigned to a user that sends only a single user credential, such as a user name, and a higher weight may be assigned to a user that sends two or more user credentials, such as a user name and a password. Various weights for calculating risk scores for one or more users may also be assigned and/or updated based on previously determined risk profiles of locations, such as URLs and/or domains, that the users submitted credentials to, and/or based on previously determined user risk profiles for the users.

In some embodiments, one or more of the systems described herein may determine, at the risk computing device, that the user presents a security risk to the organization's computer network based on the risk score calculated for the user. For example, determination module 108 may, as part of server 202 illustrated in FIG. 2, determine that the user presents a security risk to organization computer network 210 based on the risk score calculated for the user. For example, if the risk score for the user exceeds a predetermined threshold, the user may be determined to present a security risk to organization computer network 210.

In at least one embodiment, one or more of the systems described herein may perform, at the risk computing device, a security action to protect the organization's computer network based on the determination that the user presents a security risk to the organization's computer network. For example, security module 112 may, as part of server 202 illustrated in FIG. 2, perform a security action to protect organization computer network 210 based on the determination that the user presents a security risk to organization computer network 210.

Security module 112 may perform the security action in a variety of ways. For example, security module 112 may perform a security action to prevent a user from accessing organization computer network 210 for at least a specified period of time, warn the user and/or an administrator about the increased security risk presented by the user's activities, increase monitoring of user activities, limit and/or block the user's access to locations, such as URLs and/or domains external to the organization's computer network (e.g., the host computing device 220 location), change one or more organization user credentials for the user, and/or increase a risk score and/or profile for an organization associated with the organization computer network 210. In addition, security module 112 may perform a security action on locations external to the organization's computer network. For example, security module 112 may blacklist URLs and/or domains, such as a URL and/or domain hosted by host computing device 220, having a risk score exceeding a predetermined threshold. In some embodiments, risk scores for users and/or organizations may be collected and used for various risk assessment and management purposes. For example, risk data based on risk scores for users and/or organizations may be collected and used for insurance underwriting, such as cybersecurity underwriting, for the organizations.

Figure 4:
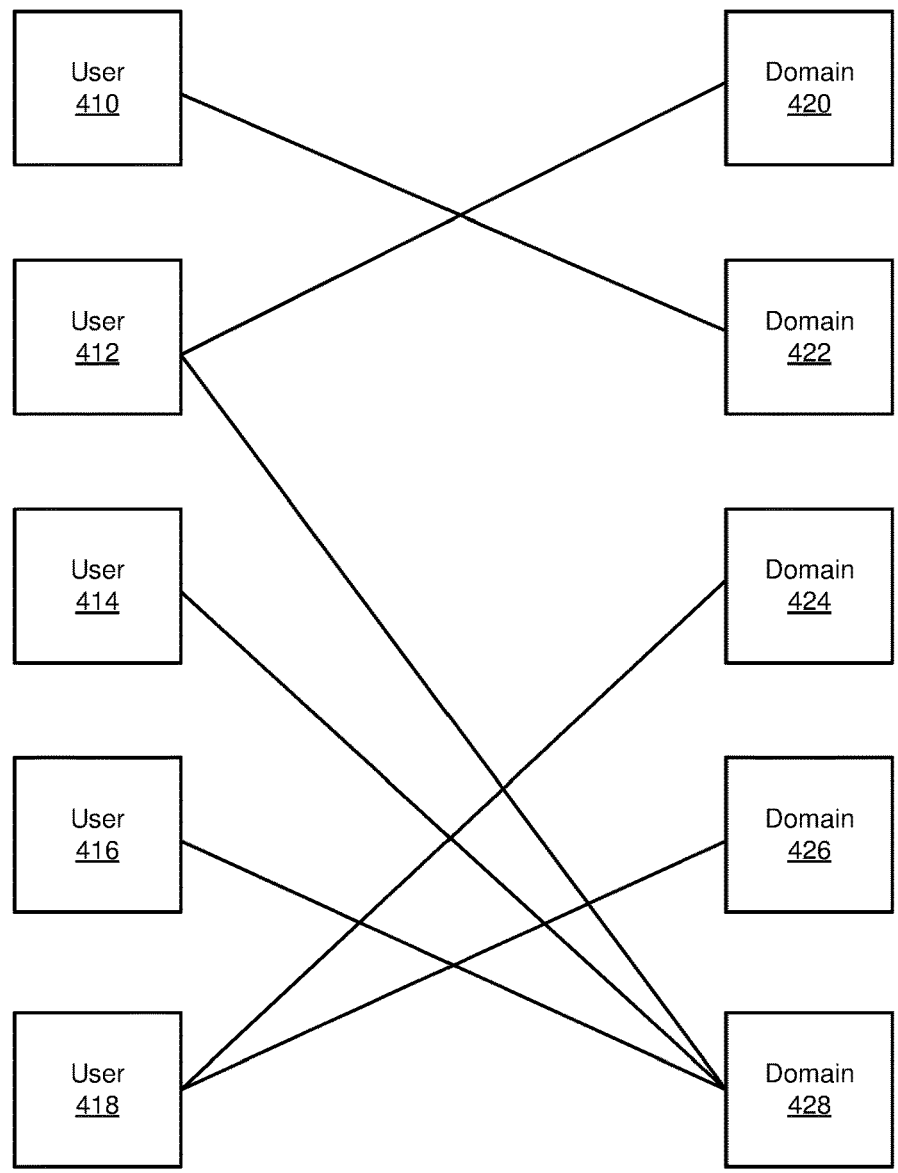
FIG. 4 is a block diagram illustrating example risk analysis data utilized for assessing security risks of users of computer networks of organizations.

FIG. 4 is a block diagram illustrating example risk analysis data that is utilized for identifying and assessing user security risk for an organization. As illustrated in FIG. 4, various users associated with an organization's computer network, such as organization computer network 210 illustrated in FIG. 2, may be determined to have electronically accessed locations that are external to the organization's computer network according to any of the systems and methods described herein.

In at least one embodiment, the described systems and methods may have identified user 410, user 412, user 414, user 416, and user 418, each of which have been determined to have shared one or more user credentials with one or more of domain 420, domain 422, domain 424, domain 426, and domain 428. In some embodiments, users 410-418 may have submitted user credentials while logged onto a user computing device associated with the organization's computer network (e.g., organization computer network 210 illustrated in FIG. 2) and/or while logged into an organization gateway associated with the organization's computer network. Domains 420-428 may each represent a separate domain associated with a URL and/or domain. The credentials sent by users 410-418 to one or more of domains 420-428 may be organization credentials that have been reused as credentials (e.g., host user credentials such as login credentials) for the respective domains 420-428.

For example, as shown in FIG. 4, user 410 has sent at least one user credential to domain 422, user 412 has sent at least one user credential to domain 420 and domain 428, user 414 has sent at least one user credential to domain 428, user 416 has sent at least one user credential to domain 428, and user 418 has sent at least one user credential to domain 424 and domain 426. In at least one embodiment, users that have submitted user credentials to a greater number of domains, such as user 412 and user 418, may be determined to have a higher calculated risk score than users that have submitted user credentials to fewer domains, such as user 410, user 414, and user 418. In some embodiments, users that have submitted multiple user credentials to a single domain and/or certain types of user credentials to a domain, may have a higher weight applied to the calculation of their risk score.

In at least one embodiment, the locations external to an organization's computer network, such as URLs and/or domains, may each have a risk score assigned based on risk profiles of the locations. For example, domains may have existing risk profiles assigned based on previous security analyses of the domains and their security reputations. The existing risk scores and/or risk profiles of the domains may be used in calculating risk scores for each user that submitted credentials to the respective domains. For example, a user that submits credentials to a domain having a higher risk score may have a higher relative user risk score, and/or a calculation used to determine the risk score for the user may include a higher weighting, than a user that submits credentials to a domain having a lower risk score. In some embodiments, previous risk scores and/or risk profiles for each user may be used in calculating updated risk scores for each user that submitted credentials to locations external to an organization's computer network. For example, one or more users associated with an organization may have existing risk profiles assigned based on previous security analyses of the users.

Each of these risk scores and/or risk profiles for the users and/or domains may be utilized to apply corresponding weights to nodes of an algorithm used to calculate risk scores for each of the users and/or domains. For example, corresponding weights may be applied to nodes of a node/edge weighted HITS algorithm used by calculation module 110 to calculate risk scores for each of users 410-418 and/or risk scores for each of domains 420-428 illustrated in FIG. 4. In one embodiment, a risk score algorithm used to calculate risk scores for each of the users and domains illustrated in FIG. 4 may result in, for example, risk scores of 0.09 for user 410, 0.12 for user 412, 0.04 for user 414, 0.08 for user 416, and 0.14 for user 418, and risk scores of 0.08 for domain 420, 0.09 for domain 422, 0.09 for domain 424, 0.05 for domain 426, and 0.16 for domain 428. The higher risk scores for user 418 and domain 428 may represent a higher level of risk associated with user 418 and domain 428 in comparison with other users and domains.

In one embodiment, URL artefacts, such as artefacts originating from logs provided by monitoring systems such as corporate gateways (e.g., BLUECOAT On-Premise Secure Web Gateway) or endpoint browsers, may be analyzed to identify users within an organization that: (i) send credentials in plain text (e.g., over HTTP), (ii) re-use passwords for multiple accounts (e.g., sanctioned accounts vs. other accounts) (intra-user reuse), (iii) use an organization email address to create shadow information-technology (shadow IT) accounts (e.g., DROPBOX) or personal accounts (e.g. news sites), and/or (iv) use somebody else's account (inter-user reuse). If a URL logging system is able to retrieve URLs originating from encrypted traffic (e.g., proxy) and/or request headers, such artefacts may be analyzed too.

Given a user (ID/name) and a list of URLs requested by that user for a given time frame, the systems and methods described herein may identify, from a list of HTTP-based URLs, those URLs where passwords have been sent in cleartext (e.g., in a query parameter such as "password" or "pwd", in the user information part of the URL). If HTTP request headers are available, HTTP Basic authentication information may also be checked. In some embodiments, encrypted traffic, such as HTTPS traffic, may be decrypted to obtain user credentials. For each URL identified, corresponding hostnames may be extracted. For each distinct hostname extracted, the systems and methods may check (i) whether intra-user password reuse occurs, (ii) whether inter-user password reuse occurs, and (iii) whether corporate email address is provided as username. A risk score may be calculated for each user so that organization users are ranked according to their usage of best security practices. This risk score may be used directly by risk management products or to inform policy-based systems (e.g., DLP/CASB, PROX- YSG, etc.) (e.g. to prevent a user from sending their corporate password to a non-sanctioned site). Additionally, collected data may be leveraged as an additional data source for a cyber insurance underwriting tool to assess the overall security posture of a given company.

As explained above in connection with method 300 in FIG. 3, the systems and methods described herein may enable analysis of interactions by organization users with host locations, such as URLs and/or domains, outside of the organization. The interactions may be analyzed to identify intra-party and inter-party reuse of organization credentials by the organization users and to generate risk scores and/or profiles for the organization users and/or for the organization. The risk scores may be used to determine users in the organization that present an increased risk to the organization. Policy-based corrective security measures may be taken to address higher-risk users in the organization, thereby preventing loss of sensitive data and increasing the security of the organization as a whole while directing resources to the users that present greatest risk. The systems and methods described herein may also be used to identify locations external to the organization's computer network, such as non-sanctioned URLs and/or domains, that are electronically accessed by users and that may present a security risk to the organization. Security measures may be put in place to prevent users from accessing such higher risk locations and/or to increase scrutiny of user access to these locations. The systems and methods described herein may also be used to cater best-practice security training to the needs of an organization by identifying risky practices engaged in by users in the organization.

Figure 5:
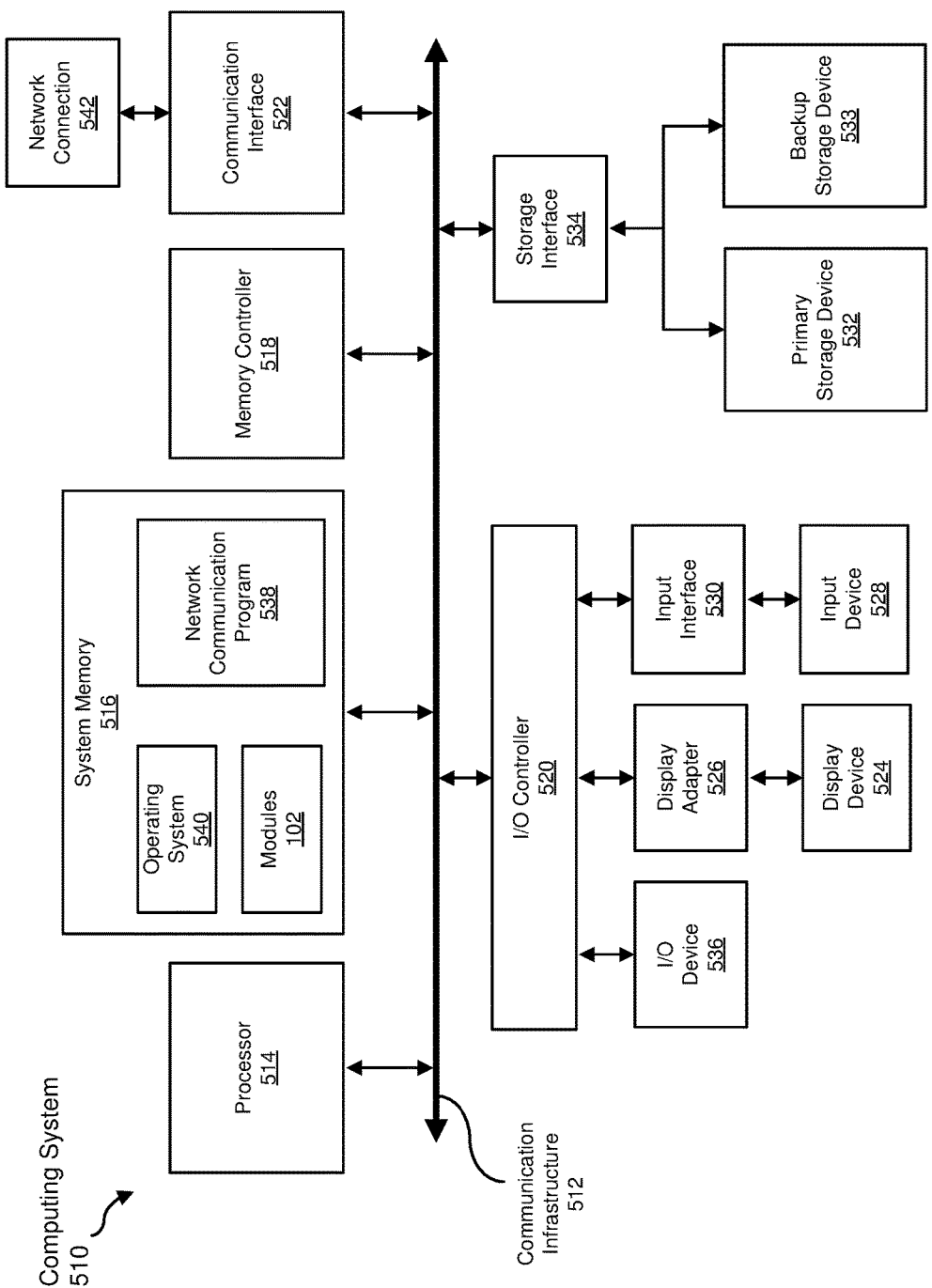
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device electronically accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
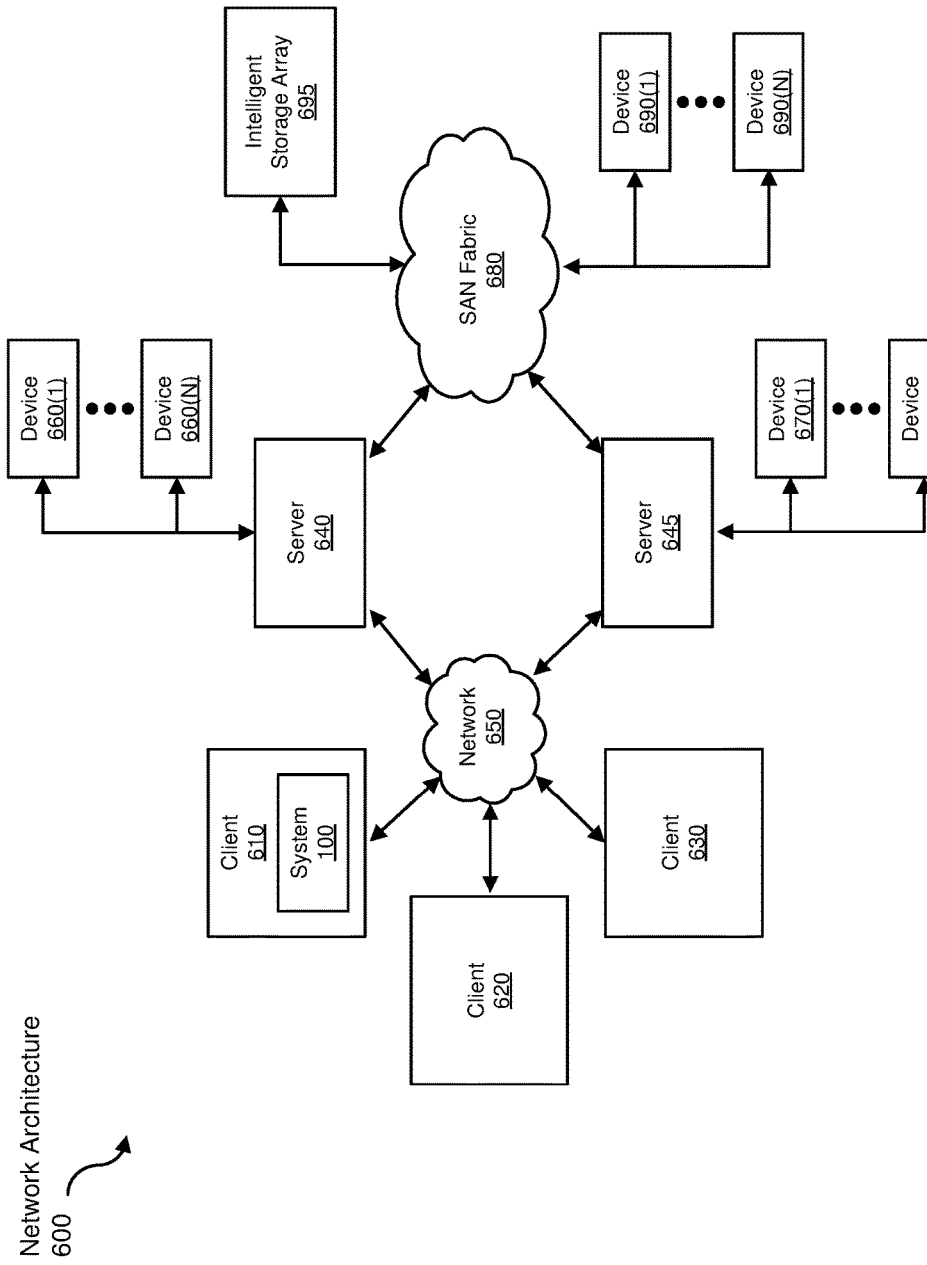
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for assessing security risks of users of computer networks of organizations.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multitenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive user and/or URL/domain data to be transformed, transform the user and/or URL/domain data to a risk score, output a result of the transformation to a computing device, use the result of the transformation to perform a security action, and store the result of the transformation to a computing device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for assessing security risks of users of computer networks of organizations, at least a portion of the method being performed by a computing device comprising at least one processor, the method comprising:

detecting, at a risk computing device, a location of a host electronically accessed by a user computing device, the host location comprising a network location and having an electronic address outside of a computer network of an organization;

identifying, at the risk computing device, a host user credential sent to the host location from the user computing device;

determining, at the risk computing device, that the host user credential matches an organization user credential associated with the organization's computer network;

calculating, at the risk computing device, a risk score for a user of the user computing device based on the determination that the host user credential matches the organization user credential;

determining, at the risk computing device, that the user presents a security risk to the organization's computer network based on the risk score; and performing, at the risk computing device, a security action to protect the organization's computer network based on the determination that the user presents a security risk to the organization's computer network.

2. The method of claim 1, wherein the organization user credential comprises at least one of:
an email address;
a password;
a user identifier;
an organization identifier;
a public key infrastructure certificate;
a token; and
a personal identification number.

3. The method of claim 1, wherein detecting the location of the host further comprises detecting, at the risk computing device, a uniform resource locator (URL) for the host location.

4. The method of claim 3, wherein detecting the location of the host further comprises detecting, at the risk computing device, a hostname for the URL.

5. The method of claim 1, further comprising determining, at the risk computing device, that the user was logged onto the user computing device when the host location was electronically accessed by the user computing device.

6. The method of claim 1, further comprising determining, at the risk computing device, that the user was logged into a web gateway of the organization's computer network when the host location was electronically accessed by the user computing device.

7. The method of claim 1, further comprising determining, at the risk computing device, that the organization user credential is associated with the user.

8. The method of claim 1, further comprising determining, at the risk computing device, that the organization user credential is associated with an additional user.

9. The method of claim 1, further comprising:
detecting, at the risk computing device, a location of an additional host electronically accessed by the user computing device, the additional host location having an electronic address outside of the organization's computer network; and
determining, at the risk computing device, that the host user credential was sent to the additional host location from the user computing device.

10. The method of claim 1, further comprising:
determining, at the risk computing device, that the host location was electronically accessed by an additional user computing device;
identifying, at the risk computing device, an additional host user credential sent to the host location from the additional user computing device; and
determining, at the risk computing device, that the additional host user credential matches an additional organization user credential associated with the organization's computer network.

11. The method of claim 1, further comprising calculating, at the risk computing device, a risk score for the host location.

12. The method of claim 1, further comprising determining, at the risk computing device, a type of credential corresponding to the organization user credential;
wherein calculating the risk score for the user further comprises utilizing a weight corresponding to the type of credential.

13. The method of claim 1, wherein calculating the risk score for the user further comprises utilizing a weight that is based on a determination of a number of host user credentials sent to the host location from the user computing device, each of the determined number of host user credentials corresponding to a separate organization user credential.

14. The method of claim 1, wherein identifying the host user credential sent to the host location further comprises identifying the host user credential in a query parameter at a URL for the host location.

15. The method of claim 1, wherein identifying the host user credential sent to the host location further comprises identifying the host user credential in a hypertext transfer protocol (HTTP) request header.

16. The method of claim 1, wherein identifying the host user credential sent to the host location further comprises decrypting information sent from the user computing device to the host location.

17. A system for assessing security risks of users of computer networks of organizations, the system comprising:
a detection module, stored in memory, that detects, at a risk computing device, a location of a host electronically accessed by a user computing device, the host location comprising a network location and having an electronic address outside of a computer network of an organization;
an identification module, stored in memory, that identifies, at the risk computing device, a host user credential sent to the host location from the user computing device;
a determination module, stored in memory, that determines, at the risk computing device, that the host user credential matches an organization user credential associated with the organization's computer network;
a calculation module, stored in memory, that calculates, at the risk computing device, a risk score for a user of the user computing device based on the determination that the host user credential matches the organization user credential; and
at least one physical processor that executes the detection module, the identification module, the determination module, and the calculation module;
wherein:
the determination module further determines, at the risk computing device, that the user presents a security risk to the organization's computer network based on the risk score;
the system further comprises a security module, stored in memory, that performs, at the risk computing device, a security action to protect the organization's computer network based on the determination that the user presents a security risk to the organization's computer network; and the physical processor further executes the security module.

18. A non-transitory computer-readable medium comprising one or more computer-executable instructions that, when executed by at least one processor of a computing device, cause the computing device to:

detect, at a risk computing device, a location of a host electronically accessed by a user computing device, the host location comprising a network location and having an electronic address outside of a computer network of an organization;

identify, at the risk computing device, a host user credential sent to the host location from the user computing device;

determine, at the risk computing device, that the host user credential matches an organization user credential associated with the organization's computer network;

calculate, at the risk computing device, a risk score for a user of the user computing device based on the determination that the host user credential matches the organization user credential;

determine, at the risk computing device, that the user presents a security risk to the organization's computer network based on the risk score; and perform, at the risk computing device, a security action to protect the organization's computer network based on the determination that the user presents a security risk to the organization's computer network.

* * * * *